(12) United States Patent
Fuentes (10) Patent No.: US 9,604,320 B1
(45) Date of Patent: Mar. 28, 2017

(54) COUNTERBALANCE PIPE

(71) Applicant: Neyda Yadira Fuentes, New Braunfels, TX (US)

(72) Inventor: Neyda Yadira Fuentes, New Braunfels, TX (US)

(73) Assignee: Neyda Yadira Fuentes, Spring Branch, TX (US)

( * ) Notice: Subject to any disclaimer, the term of this patent is extended or adjusted under 35 U.S.C. 154(b) by 0 days.

(21) Appl. No.: 14/950,524

(22) Filed: Nov. 24, 2015

(51) Int. Cl.
*F16M 11/00* (2006.01)
*B23K 37/053* (2006.01)
*F16L 9/02* (2006.01)
*F16M 11/28* (2006.01)
*B23K 101/06* (2006.01)

(52) U.S. Cl.
CPC ............ *B23K 37/0538* (2013.01); *F16L 9/02* (2013.01); *F16M 11/28* (2013.01); *B23K 2201/06* (2013.01); *F16M 2200/04* (2013.01)

(58) Field of Classification Search
CPC ....... B23K 37/0538; F16L 9/02; F16M 11/28; F16M 2200/04
See application file for complete search history.

(56) References Cited

U.S. PATENT DOCUMENTS

| | | | | |
|---|---|---|---|---|
| 4,221,362 A * | 9/1980 | Van Santen | ............. | E04G 25/04 248/354.6 |
| 5,758,854 A * | 6/1998 | Shih | .................... | F16B 37/0864 248/354.3 |
| 6,349,512 B1 * | 2/2002 | Berkey | ................. | E04G 25/065 52/126.6 |
| 6,612,533 B2 * | 9/2003 | Biles | ...................... | B25H 3/006 248/125.1 |

* cited by examiner

*Primary Examiner* — Amy Sterling (57) ABSTRACT

The counterbalance pipe it is designed for the pipe line welding field. The procedure of using this device it is to attach the Counterbalance Pipe to the pipe line by a chain clamp pliers without the needing of to be welded to the pipe line. The purpose of this devise it is to balance the weight of the pipes that it requires to be welded in a roll out weld position, which allows the user to roll the pipe line in a 360 degrees on top of a roller Jack stands, especially if is welding fittings such as elbows, nineties, tees, coupling or any other fitting that it needs to be welded on roll out weld position. In addition, the user may add 1, 2 or 3 weight iron disc to add more weight depending on the weight that it needs to be balanced.

1 Claim, 14 Drawing Sheets

COUNTERBALANCE PIPE

The Counterbalance Pipe is designed for the pipe welding procedure which the process of making this device it is with a 6 inches by 1.5 carbon steel 45 degree angle which a 0.375 diameter hole is made in the center of the angle, therefore a 17 inches by 0.375 diameter cold roller rod it is welded to the hole made on the carbon steel angle, which this it is the basis of the Counterbalance Pipe. Next, on a 14 inches carbon steel pipe it is welded a 0.75 carbon steel hexagonal nut for direction and stabilization which in the same carbon steel pipe are perforated five 0.25 diameter holes (leaving a 3 inches space between holes). Moreover, the carbon steel pipe is inserted to the cold roller rod which after is inserted a 0.375 diameter carbon steel hexagonal nut it is welded to the upper-end of the cold roller rod to stop and secure the inner 14 inches carbon steel pipe. Additionally, a 10 inches by 0.75 diameter all-threaded rod it is welded 3 inches inside of the inner 14 inches carbon steel pipe wherein is perforated a 0.125 hole at 1.5 inches from the upper-end of the all-thread rod. Next on a 20 inches by 1.25 inches diameter carbon steel pipe it is cut-off a 1 inch 45 degree angle in the bottom-end of the pipe and also a 0.25 diameter hole is perforated in the upper-end which it is 1.5 inches from the upper-end of the pipe. After this is done then the 20 inches by 1.25 carbon steel pipe it is inserted over the 14 inches carbon steel pipe and is welded to the 40 degree angle made as basis which this procedure makes a telescopic form, allowing to be extended or reduced which it is locked and retain by a round wire lock pin that its inserted to the holes made on the 20 inches carbon steel pipe and the either of the five holes made on the 14 inches carbon steel pipe. In addition, one or three iron weight discs may be inserted to the all-thread rod to add weight depending on the user requirement, which are secured and tightened by two 0.75 hexagonal nuts on each end of the all-thread rod and also has a 0.125 safety hitch pin clip inserted to the perforated 0.125 hole made 1.5 inches from the upper-end of the all-thread rod. Lastly the way of using the counterbalance it is to be attached with a chain clamp pliers to the steel pipeline which it needs to be on a roller jack stand to be roll on a 360 degree to be welded to a fitting such as elbows, nineties, tees, flanges, or other fittings that the weight needs to be balanced.

BRIEF SUMMARY OF THE INVENTION OF THE COUNTERBALANCE PIPE

The general idea of this invention is to make the pipe welding procedure easy and productive, especially for the roll out weld position, which to perform this welding procedure may be difficult for some welders since the gravity of the fittings pull down the weight making difficult to roll the pipeline to perform the welding procedure. The Counterbalance Pipe it is a device designed to counterbalance pipes causing the pipe line stable and locked allowing the welder do the weld roll out on the roller jack stand without difficulties. Additionally this device allows the welder roll the pipe line 360 degrees (on a roller Jack stands), especially if the welder it is welding fittings parts such as flanges, elbows, tees, coupling or other fitting that has an extra unbalance weight. Furthermore, the procedure to use the Counterbalance Pipe it is to attach and secured the basis to the surface of the pipe line with a chain clamp pliers that may be 8 inches, 12 inches or 16 inches long chains, depending on the diameter of the pipeline, which the this device do not require to be welded to the pipe line. In addition, The upper-top of the Counterbalance Pipe contains a 10 inches by 1 inch diameter all-thread rod to which it may insert 1, 2 or 3 weight iron disc to add weight if is necessary for the balance of the pipeline.

DESCRIPTION OF THE DRAWINGS OF THE COUNTERBALANCE PIPE

Referring to the drawings of FIG. 1 through FIG. 10.

Referring to the drawings of FIG. 11. Through FIG. 27, which point out the steps used to construct the Counterbalance Pipe.

DESCRIPTION OF THE COUNTERBALANCE PIPE

Figure 1:
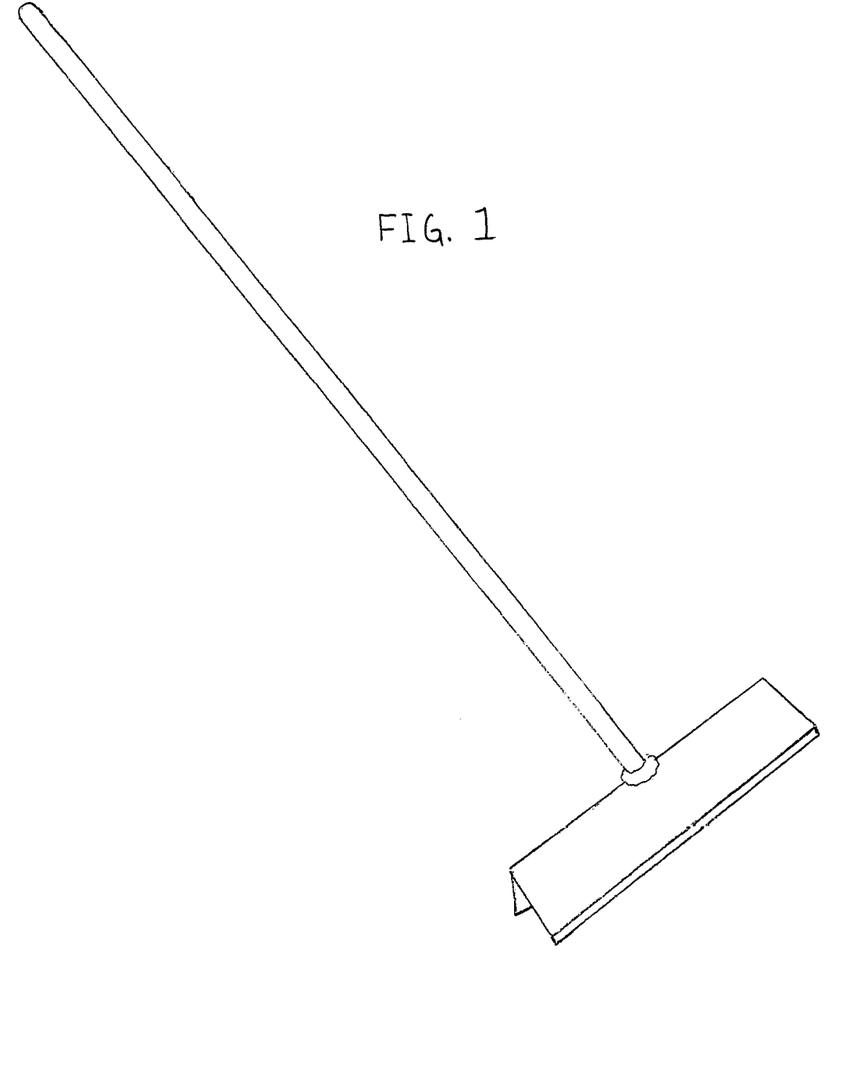
FIG. 1: Shows the carbon steel 45 degree angle welded to the cold roller rod which makes the basis of the Counterbalance Pipe.
Figure 2:
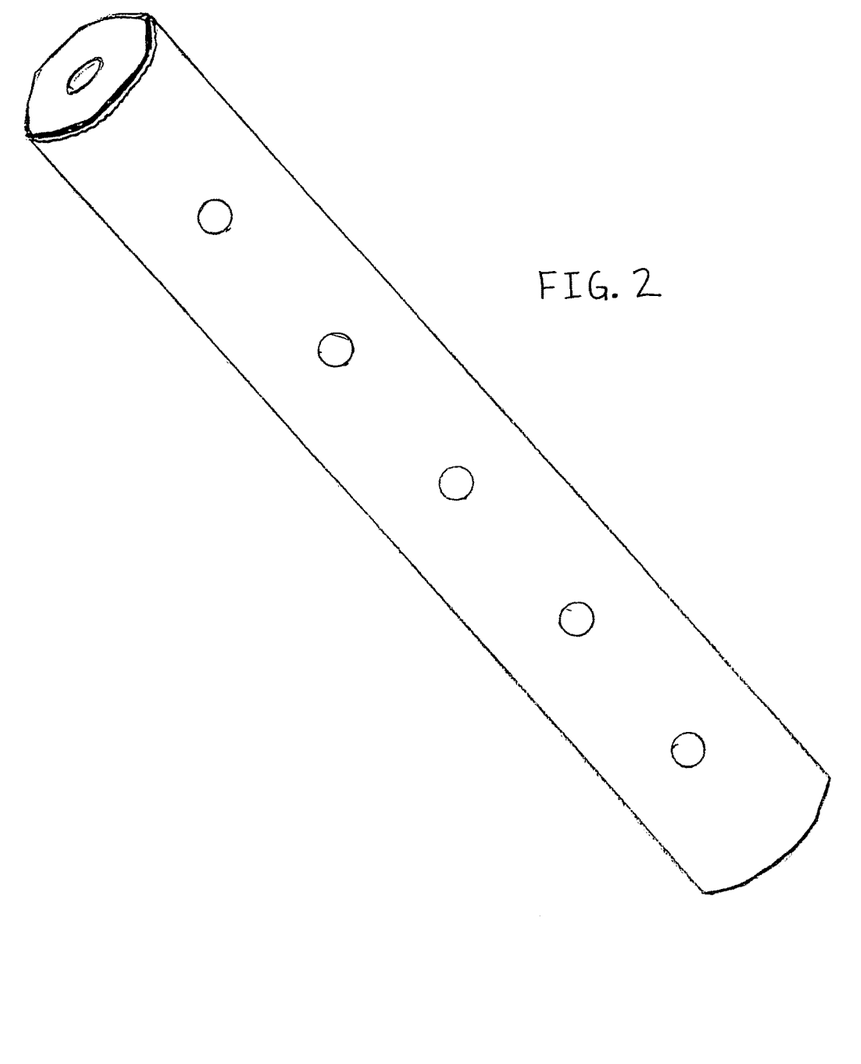
FIG. 2: Shows the 0.75 hexagonal nut welded in the bottom of the carbon steel pipe and also shows the five of 0.25 diameter holes made in to the carbon steel pipe.
Figure 3:
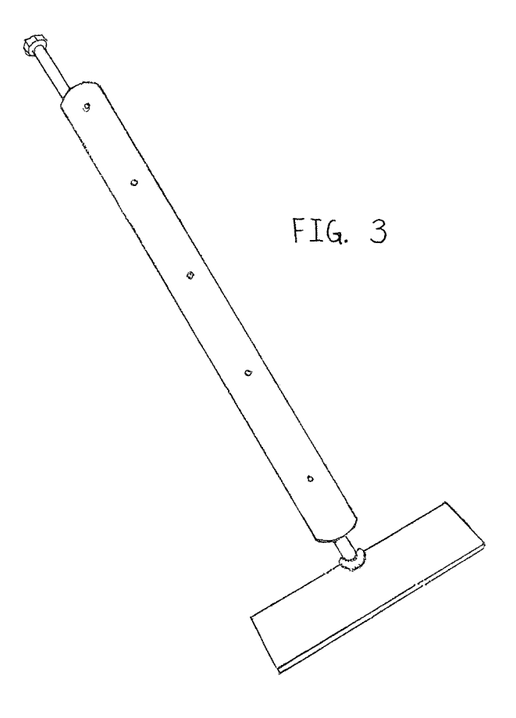
FIG. 3: Shows the internal carbon pipe inserted to the basis of the Counterbalance Pipe and also shows the 0.75 inches hexagonal nut welded to the upper-end of the cold roller rod.
Figure 4:
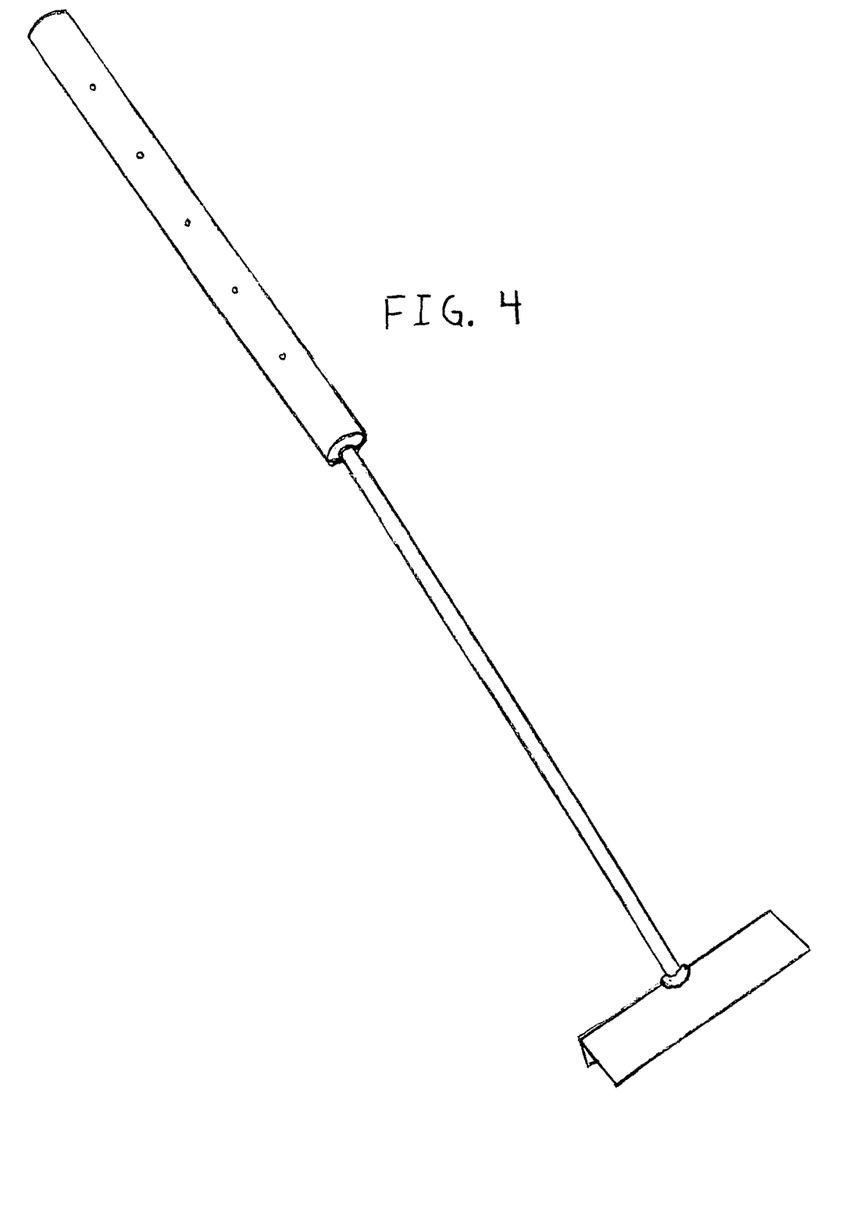
FIG. 4: Shows the carbon steel pipe secured with the hexagonal nut welded to the carbon steel pipe and also shows the hexagonal nut welded to the upper-end of the cold roller rod.
Figure 5:
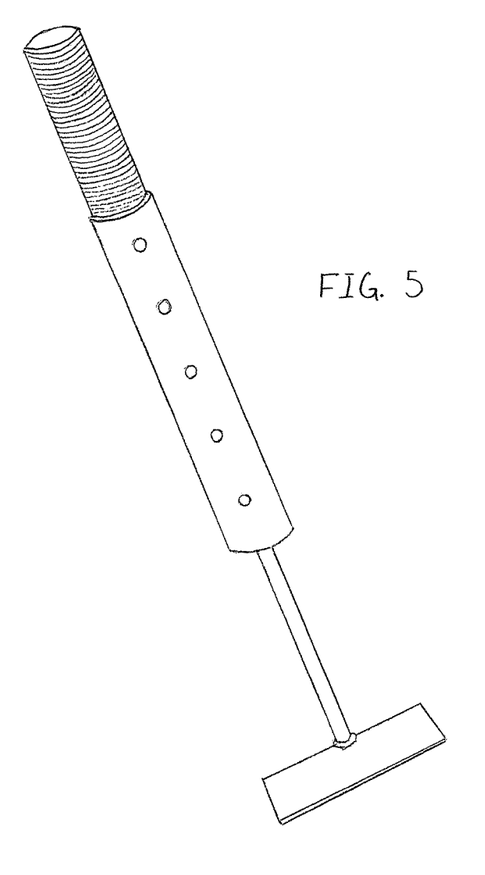
FIG. 5: Shows the all-thread rod welded to the upper-end of the internal carbon steel pipe.
Figure 6:
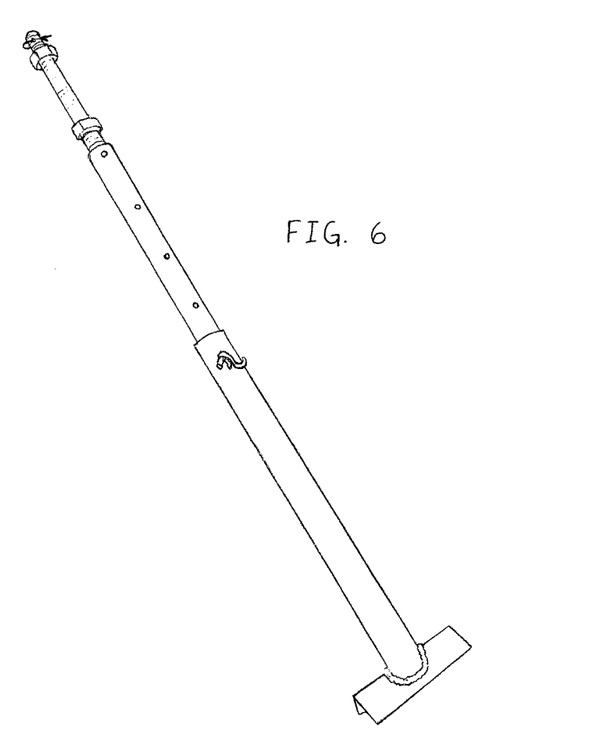
FIG. 6: Shows the Counterbalance Pipe as a finished product and also shows the lock position on the last hole of the five holes made on the internal carbon steel pipe.
Figure 7:
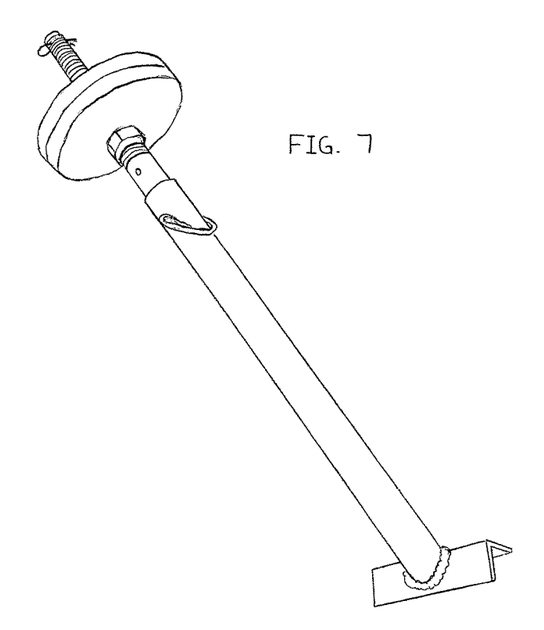
FIG. 7: Shows the Counterbalance Pipe with two of the weight iron disc that it can be added to improve weight to the Counterbalance Pipe if is required.
Figure 8:
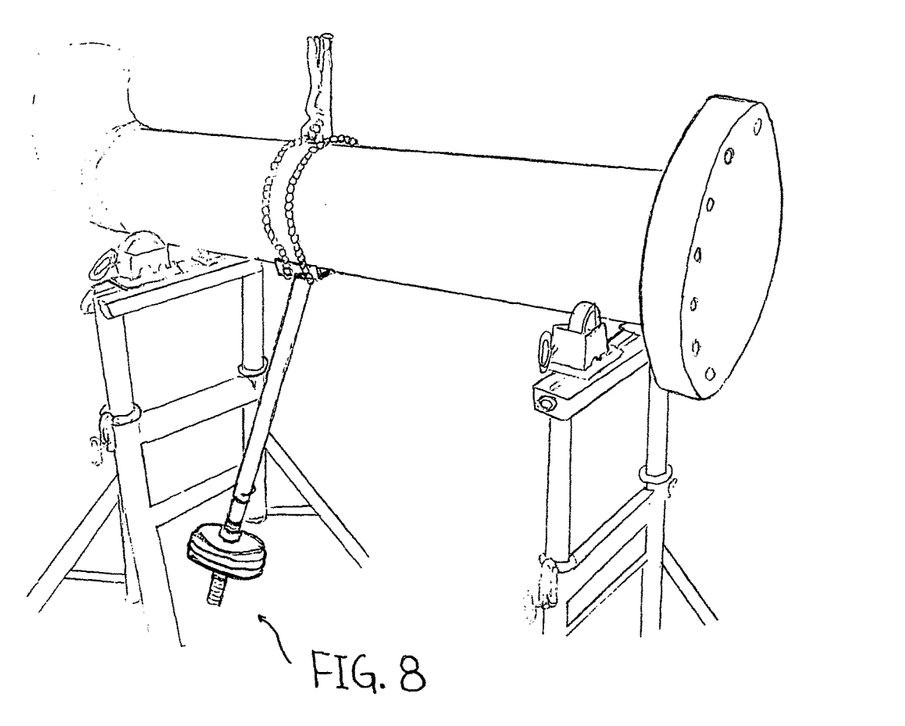
FIG. 8: Shows the Counterbalance Pipe with three weight iron disc attached to the pipe line with a two chain clamp pliers and also shows a fitting as an elbow shape being welded to the pipe line.
Figure 9:
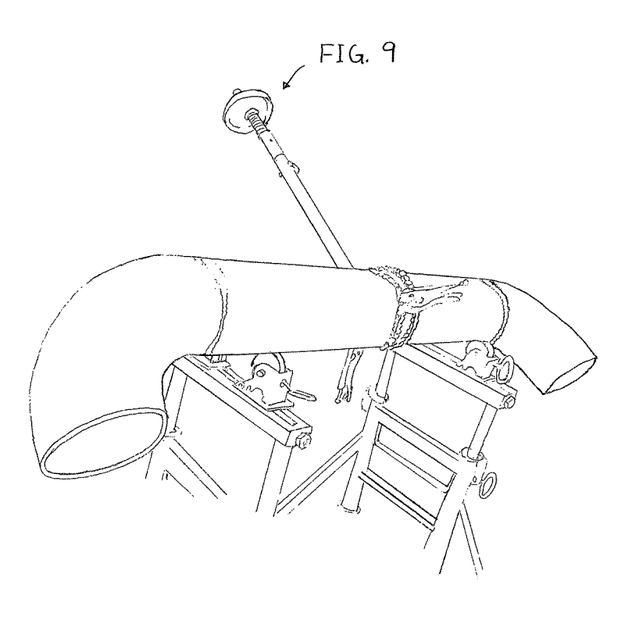
FIG. 9: Shows the Counterbalance Pipe with a weight iron disc attached to the pipe line with a two chain clamp pliers and also shows two fitting with an elbow shape being welded to the pipe line.
Figure 10:
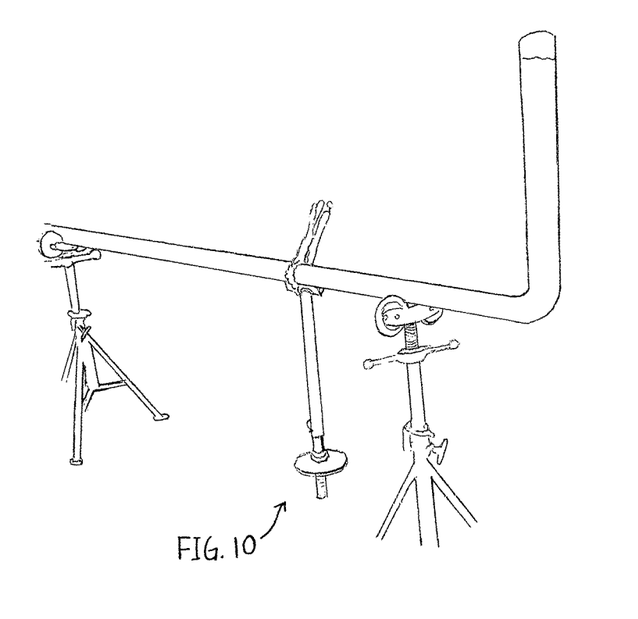
FIG. 10: Shows the Counterbalance Pipe with a weight iron disc attached to the pipe line with a chain clamp pliers and also shows a 90° degree pipe line being balanced.
Figure 11:
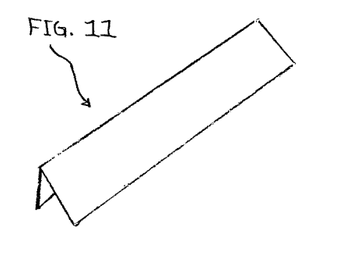
FIG. 11: Shows the carbon steel 45 degree angle which the measurements are 6 inches by 1.5 inches by 0.25 inches.
Figure 12:
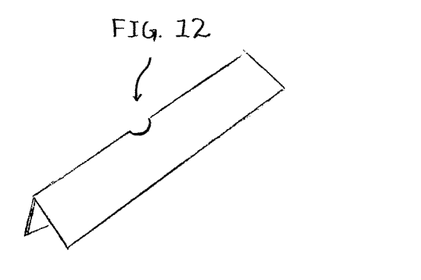
FIG. 12: Shows the 0.375 diameter hole made in center of the carbon steel 45 degree angle.
Figure 13:
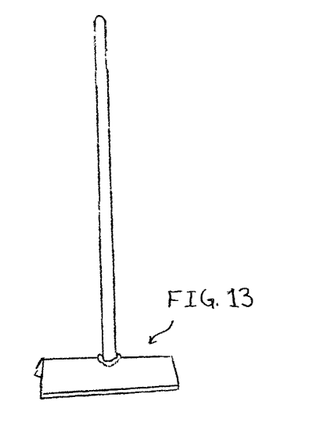
FIG. 13: Shows a 17 inches by 0.375 diameter carbon steel cold roller rod that it is welded to the 0.375 diameter hole made in center of the carbon steel 45° degree angle.
Figure 14:
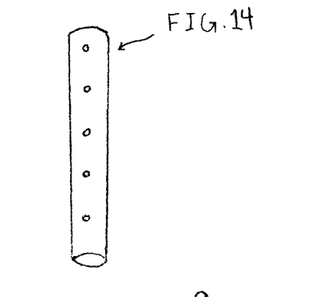
FIG. 14: Shows the 5 of 0.25 holes made in the 14 inches by 1 inch diameter carbon steel pipe.
Figure 15:
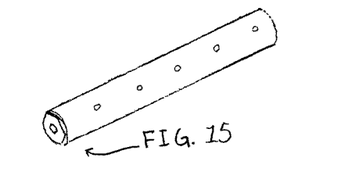
FIG. 15: Shows a 0.75 inches carbon steel hexagonal nut welded in to the bottom-end of 14 inches by 1 inch diameter carbon steel pipe.
Figure 16:
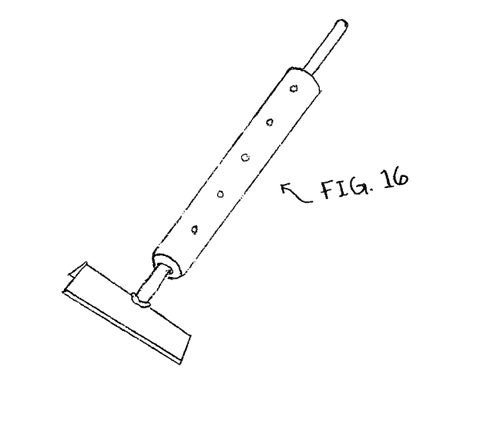
FIG. 16: Shows the 14 inches by 1 inch diameter carbon steel pipe inserted into the carbon steel cold roller rod.
Figure 17:
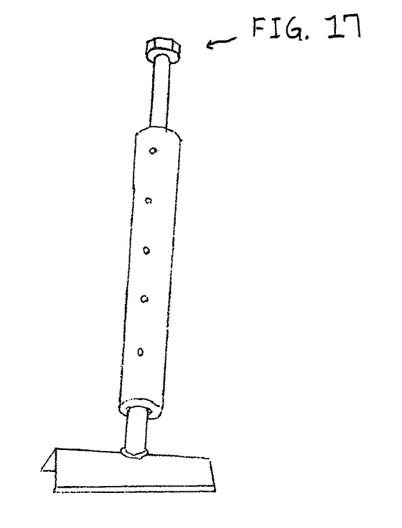
FIG. 17: Shows a 0.375 inches carbon steel hexagonal nut welded into the upper-end of the carbon steel cold roller rod.
Figure 18:
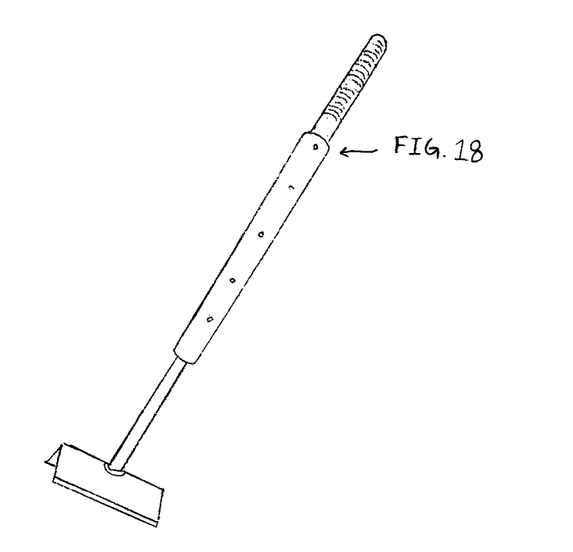
FIG. 18: Shows a 10 inches by 0.75 diameter carbon steel all-thread rod welded 3 inches inside of the upper-end of carbon steel pipe.
Figure 19:
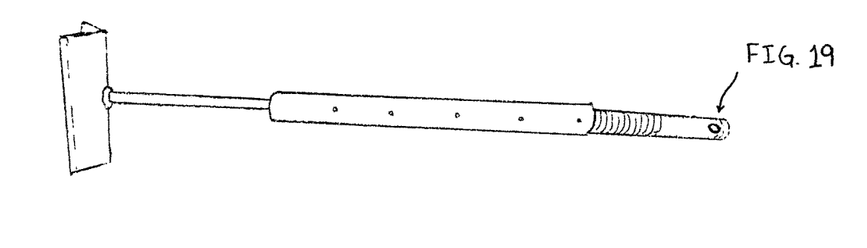
FIG. 19: Shows a perforated 0.125 diameter hole made into the top of all-thread rod, 1.5 inches from the upper-end of the all-thread rod.
Figure 20:
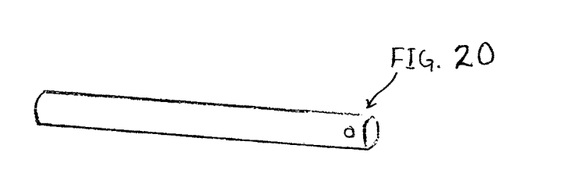
FIG. 20: Shows a perforated 0.25 diameter hole made on 1.5 inches from the upper-end of a 20 inches by 1.25 diameter of the carbon steel pipe.
Figure 21:
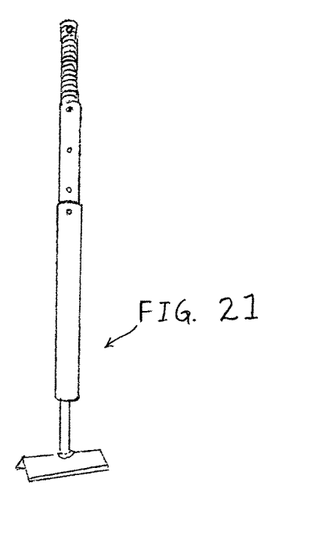
FIG. 21: Shows the 20 inches by 1.25 diameter carbon steel pipe inserted over the basis and the 14 inches by 1 inch diameter carbon steel pipe.
Figure 22:
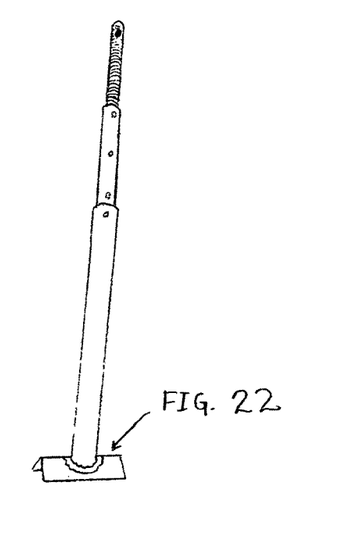
FIG. 22: Shows the 20 inches by 1.25 diameter carbon steel pipe welded into the basis of the counterbalance pipe.
Figure 23:
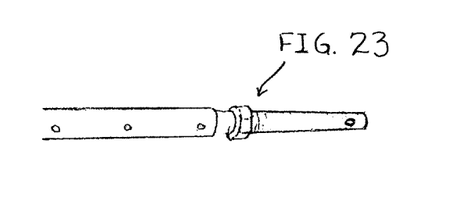
FIG. 23: Shows a 0.75 hexagonal carbon steel nut inserted on the all-thread rod.
Figure 24:
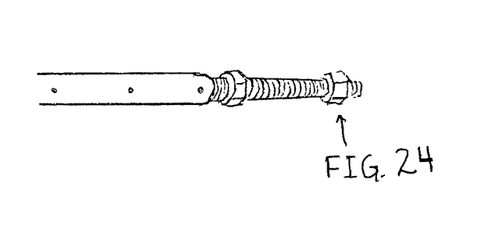
FIG. 24: Shows the second 0.75 hexagonal carbon steel nut inserted on the all-thread rod.
Figure 25:
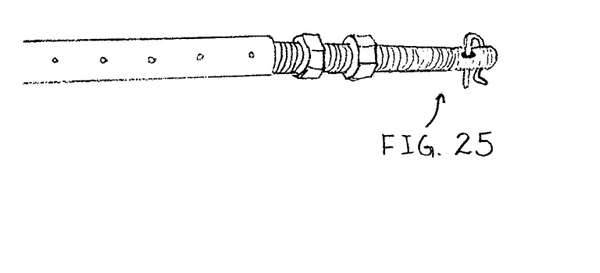
FIG. 25: Shows a 0.125 safety pin clip inserted on the 0.125 diameter hole made on the all-thread rod.
Figure 26:
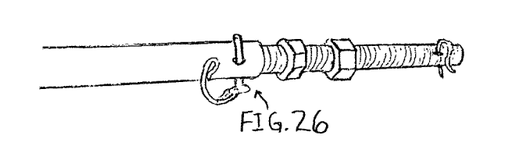
FIG. 26: Shows a round wire lock pin inserted on the 0.25 diameter hole of the 20 inches by 1.25 diameter carbon steel pipe transferring into one of the hole made on the 14 inches by 1 inch diameter carbon steel pipe.
Figure 27:
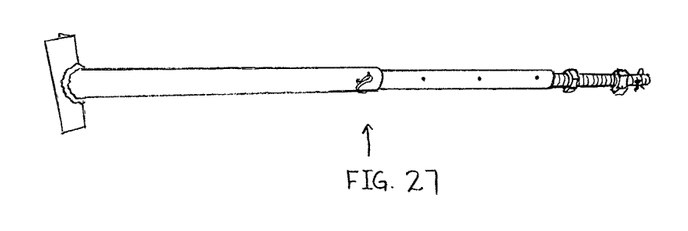
FIG. 27: Shows the finished product and also shows the Counterbalance Pipe locked on the fourth hole.

The counterbalance Pipe is a device invented for a pipe welding procedure and it is intended for pipe lines of carbon steel or stainless steel materials, which when welding some parts (fittings) to the pipe line, such as elbows, nineties, tee, flanges, or other unbalance parts (fittings), the gravity of the unbalance part (fittings) goes down, and the pipeline will lose stability and the pipe line to be welded may no longer be rotated on the jack stand rolls. Therefore, with the Counterbalance Pipe the unbalance problem will be fixed, because by attaching the Counterbalance Pipe provides the same weight amount of the unbalance part (fitting) to the opposite side which will makes the roll out welding procedure easier and productive.

The Counterbalance Pipe is designed with the basis which it is 45 degree angle with measurements of 6 inches by 1.5 inches by 0.25 inches of carbon steel material and two carbon steel pipes; the internal carbon steel pipe and the external carbon steel pipe, giving a telescopic form, which may be extended or reduced depending on the weight required. Furthermore, the internal carbon steel pipe measurement are 14 inches long by 1 inch of diameter with five a 0.25 diameter holes distributed along the pipe which a round wire lock pin it is inserted to these holes to lock and retain the chosen telescopic position. Also the internal carbon steel pipe has a 0.75 hexagonal nut welded in the bottom-end and has a 10 inches long by 0.75 diameter all-threaded rod welded in the upper-end which only 3 inches are welded inside of the internal carbon steel pipe and the 7 inches of all-threaded rod remaining are used to insert one to three weight iron discs, for the purpose of adding weight to the Counterbalance Pipe.

Additionally, inside of the internal carbon steel pipe there is a 17 inches by 0.375 diameter long cold roller rod that it is welded in the middle of the basis and the cold roller rod which has a 0.375 hexagonal nut welded to the upper-end that not only creates a secured lock, but also retained the internal carbon steel pipe inside of the external carbon steel pipe. Next, the external carbon steel pipe measurements are 20 inches long by 1.25 diameter, which it is a 0.25 diameter hole pierced 1.5 inches from the upper-end and it is placed over the internal carbon steel pipe continuing to be welded to the basis. In addition, a round wire lock pin in insert to the hole made on the external carbon steel pipe transcending to any of the hole made in the internal carbon steel pipe to lock and retained the desired extension.

The invention claimed is:

1. A counterbalance pipe, comprising: a Counterbalance pipe base which is made of carbon steel with a 45-degree angle wherein a hole is perforated on a center of the angle; and a carbon steel cold roller rod is welded to the perforated hole; and a carbon steel pipe is inserted on top of the cold roller rod; the carbon steel pipe includes five holes perforated in an upper-end and a steel hexagonal nut welded inside on a bottom-end; a carbon steel hexagonal nut is welded into an upper-end of the carbon steel cold roller rod; the nut which is configured to keep the carbon steel pipe from coming out of the a carbon steel cold roller rod; a threaded rod is welded three inches inside of the upper-end of the carbon steel pipe leaving out seven inches of the threaded rod; two hexagonal carbon steel nuts are inserted on the threaded rod; and two safety pins are inserted on a hole made on the threaded rod, and a round wire lock pin is inserted into any hole of the carbon steel pipe.

\* \* \* \* \*